United States Patent
Quisenberry

(10) Patent No.: US 9,380,796 B1
(45) Date of Patent: Jul. 5, 2016

(54) CRAB CLEANER

(71) Applicant: Todd Quisenberry, Poulsbo, WA (US)

(72) Inventor: Todd Quisenberry, Poulsbo, WA (US)

(*) Notice: Subject to any disclaimer, the term of this patent is extended or adjusted under 35 U.S.C. 154(b) by 0 days.

(21) Appl. No.: 14/806,729

(22) Filed: Jul. 23, 2015

(51) Int. Cl.
*A22C 29/00* (2006.01)
*A22C 29/02* (2006.01)

(52) U.S. Cl.
CPC .................................. *A22C 29/024* (2013.01)

(58) Field of Classification Search
CPC .... A22C 29/00; A22C 29/021; A22C 29/024; A22C 29/025; A22C 29/027
USPC ............................ 452/1–13, 45–17, 102–105
See application file for complete search history.

(56) References Cited

U.S. PATENT DOCUMENTS

| | | | | |
|---|---|---|---|---|
| 1,693,761 A | * | 12/1928 | Macripo | A47J 47/005 269/54.5 |
| 5,830,049 A | | 11/1998 | Haley et al. | |
| 6,244,948 B1 | * | 6/2001 | LiRosi | A22C 29/046 452/16 |
| 7,022,006 B1 | * | 4/2006 | Naglich | A22C 29/024 452/102 |
| 7,393,270 B2 | | 7/2008 | Cross | |
| 7,547,246 B1 | | 6/2009 | Verret | |

* cited by examiner

*Primary Examiner* — Richard Price, Jr.
(74) *Attorney, Agent, or Firm* — Crossley & Stevenson Intellectual Property Law

(57) ABSTRACT

A crab cleaner including a base and a wedge blade fixedly disposed atop the base. A rounded apex of the wedge blade is provided for splitting the crab's carapace into right and left halves upon pushing the carapace forward side onto the apex with a quick downward motion.

4 Claims, 3 Drawing Sheets

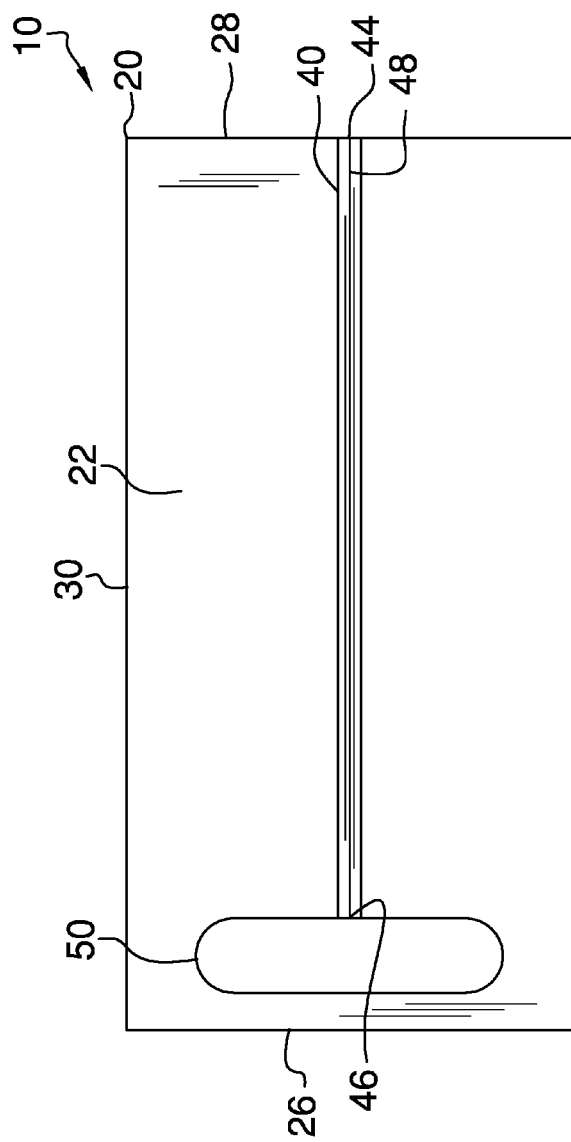
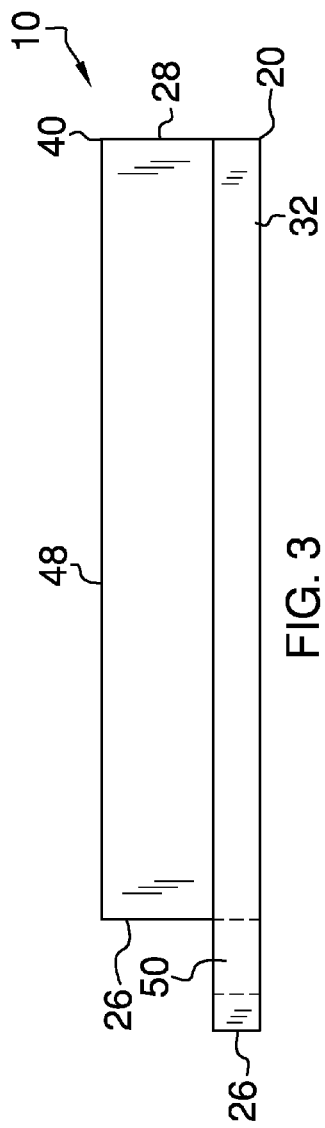

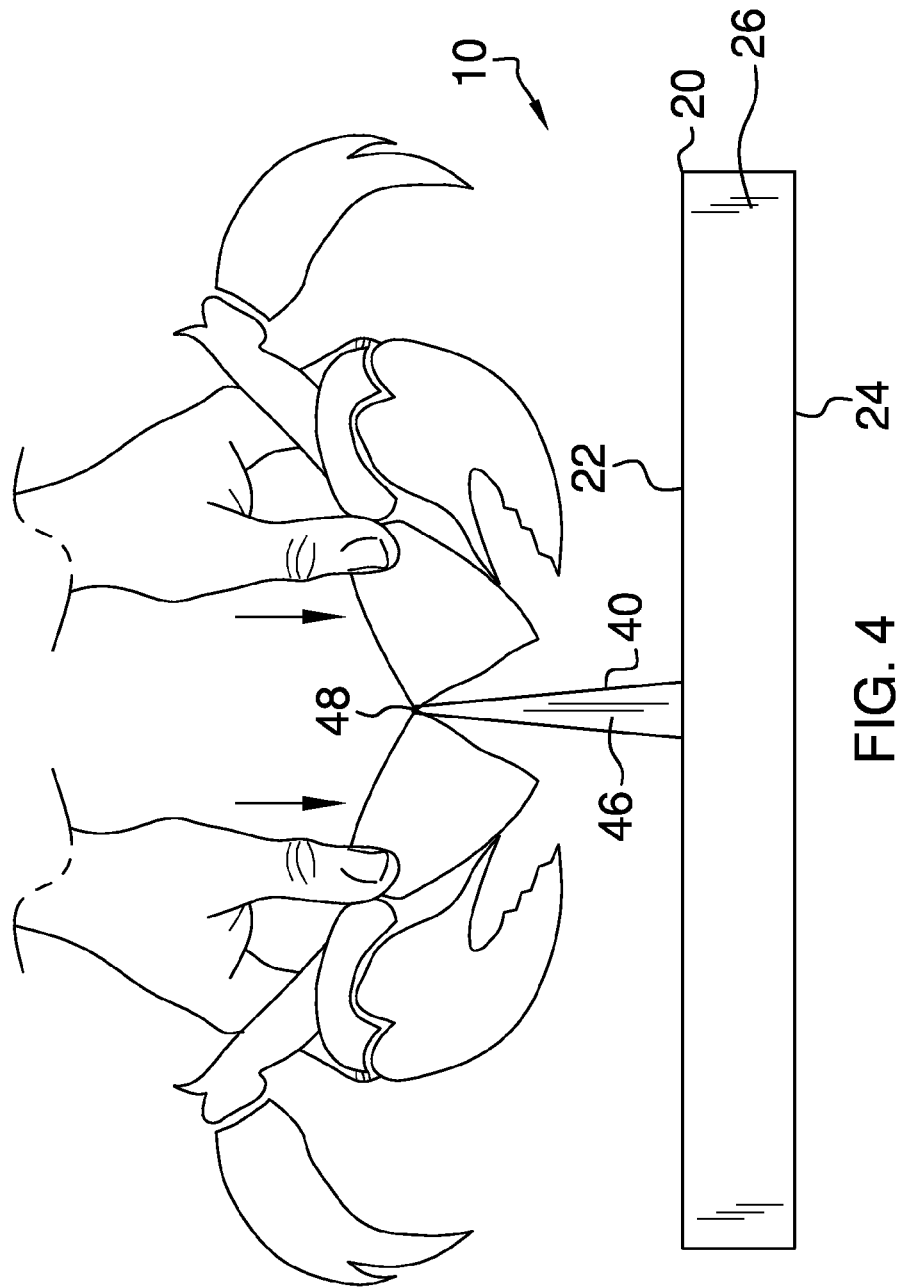

CRAB CLEANER

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various devices for cracking, opening, shelling, and cleaning shellfish are known in the prior art. However, what is needed is a crab cleaner including which provides a cracking tool for efficient splitting of a crab into right and left halves.

FIELD OF THE INVENTION

The present invention relates to shellfish cracking tools, and more particularly, to a crab cleaner.

SUMMARY OF THE INVENTION

The general purpose of the present crab cleaner, described subsequently in greater detail, is to provide a crab cleaner which has many novel features that result in a crab cleaner which is not anticipated, rendered obvious, suggested, or even implied by prior art, either alone or in combination thereof.

To accomplish this, the present crab cleaner includes a parallelepiped base with a wedge blade fixed attached in a vertical position to a top side of the base. The base has a length the same length as at least a crab's entire carapace in order to permit positioning of the crab's entire carapace directly above the top side and without extending beyond the top side. The wedge blade has a rounded apex configured to provide a splitting surface to split the crab's carapace into approximately right and left halves along a midline axis from a forward side of the carapace to a rearward side of the carapace. The wedge structure of the blade and fixed attachment to the base provide a stable surface for cracking a crab's carapace and a greater surface for splitting a crab open than a parallelepiped plate. An obround handle opening disposed in the base between the front side and a forward end of the wedge blade allows a user to carry the base for use and storage in various locations.

In use, when a crab's carapace is to be split open into halves, the user holds the crab's carapace at a juncture with the legs with the carapace rearward side directed upwardly away from the apex and toward the user and the carapace forward side directed toward the apex. The carapace is then pushed onto the apex with a quick downward motion so that the carapace is cracked into a right half and a left half.

Thus has been broadly outlined the more important features of the present crab cleaner so that the detailed description thereof that follows may be better understood and in order that the present contribution to the art may be better appreciated.

BRIEF DESCRIPTION OF THE DRAWINGS

Figures

FIG. 2 is a top plan view.
FIG. 3 is a side elevation view.
FIG. 4 is a rear elevation view.

DETAILED DESCRIPTION OF THE DRAWINGS

Figure 1:
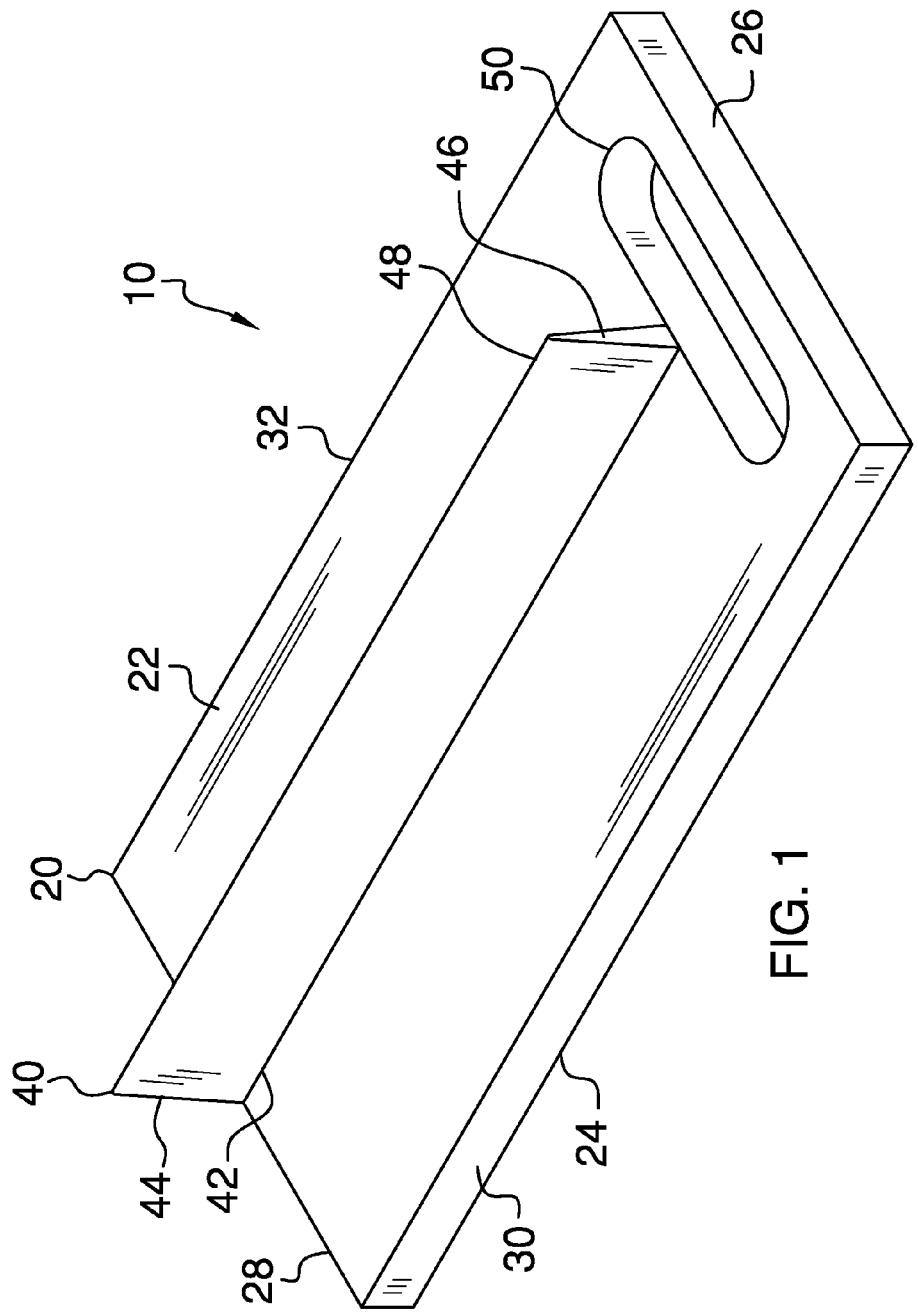
FIG. 1 is a front isometric view.

With reference now to the drawings, and in particular FIGS. 1 through 4 thereof, an example of the instant crab cleaner employing the principles and concepts of the present crab cleaner and generally designated by the reference number 10 will be described.

Referring to FIGS. 1 through 4 the present crab cleaner 10 is illustrated. The crab cleaner 10 includes a parallelepiped base 20 having a top side 22, a bottom side 24, a front side 26, a rear side 28, a left side 30, and a right side 32. The base has a length from the front side 26 to the rear side 28 which is the same length as at least a crab's entire carapace in order to permit positioning of the crab's entire carapace directly above the top side 22 without extending beyond the top side 22.

A wedge blade 40 extends vertically from the top side 22 in a position parallel to each of the right and left sides 32, 30 of the base 20. The wedge blade 40 has an underside 42 fixedly disposed on the base 20 top side 22, a rearward end 44 on the top side 22 directly adjacent the rear side 28 of the base 20, and a forward end 46 proximal the front side 26 of the base 20. The wedge blade 40 has an isosceles triangular cross-section. In addition, the underside 42 has a length shorter than a length of the two other sides of the wedge blade 40. Further, the wedge blade 40 has a rounded apex 48 configured to provide a splitting surface to split the crab's carapace into approximately right and left halves along a midline axis from a forward side of the carapace to a rearward side of the carapace. The apex 48 is rounded to provide a safer splitting edge that would be provided by a completely sharp edge and to The wedge structure of the blade 40 and fixed attachment to the base 29 provide more stability than a plate for cracking a crab's carapace and a plate that is removably attached to a base. The wedge structure of the wedge blade 40 also provides a greater surface for splitting a crab open than a parallelepiped plate.

An obround handle opening 50 is disposed in the base 20 between the front side 26 and the forward end 46 of the wedge blade 40.

In use, when a crab's carapace is to be split open into halves, the user holds the crab's carapace at a juncture with the legs with the carapace rearward side directed upwardly away from the apex 48 and toward the user and the carapace forward side directed toward the apex 48. The carapace is then pushed onto the apex 48 with a quick downward motion so that the carapace is cracked into a right half and a left half.

The base 20 has a length of approximately 12.0 inches, a width of approximately 6.0 inches, and a height of approximately 0.625 inch. The wedge blade 40 has a length of approximately 10.5 inches and a height of approximately 1.5 inches with the underside 42 of the wedge blade 40 having a width of approximately 0.3125 inches and the apex having a width of in a range of approximately 0.015 inches to 0.030 inches. The handle opening 50 has a width of approximately 1.0 inch and a length of approximately 4.0 inches and is disposed approximately 0.5 inch from the front side 26 of the base 20. The foregoing dimensions are preferable to other dimensions in order to best serve the functions of the present device 10.

What is claimed is:

1. A crab cleaner comprising:
a base having a top side, a bottom side, a front side, a rear side, a left side, and a right side, wherein the base has a length from the front side to the rear side being the same length as at least a crab's entire carapace, wherein the base length is configured to permit positioning of the crab's entire carapace directly above the top side without extending beyond the top side; and
a wedge blade extending vertically from the top side in a position parallel to each of the right and left sides of the base, the wedge blade having an underside fixedly disposed directly on the base top side, a rearward end on the top side directly adjacent the rear side of the base, and a forward end on the top side proximal the front side of the base;
wherein the wedge blade has an isosceles triangular cross-section, wherein the underside has a length shorter than a length of the two other sides of the wedge blade;
wherein the wedge blade has a rounded apex configured to provide a splitting surface to split the crab's carapace into approximately right and left halves along a midline axis from a forward side of the carapace to a rearward side of the carapace.

2. The crab cleaner of claim 1 comprising:
a handle opening disposed in the base between the front side and the forward end of the wedge blade.

3. The crab cleaner of claim 2 wherein the handle opening is obround.

4. A crab cleaner comprising:
a parallelepiped base having a top side, a bottom side, a front side, a rear side, a left side, and a right side, wherein the base has a length from the front side to the rear side being the same length as at least a crab's entire carapace, wherein the base length is configured to permit positioning of the crab's entire carapace directly above the top side without extending beyond the top side;
a wedge blade extending vertically from the top side in a position parallel to each of the right and left sides of the base, the wedge blade having an underside fixedly disposed directly on the base top side, a rearward end on the top side directly adjacent the rear side of the base, and a forward end on the top side proximal the front side of the base;
an obround handle opening disposed in the base between the front side and the forward end of the wedge blade;
wherein the wedge blade has an isosceles triangular cross-section, wherein the underside has a length shorter than a length of the two other sides of the wedge blade; and
wherein the wedge blade has a rounded apex configured to provide a splitting surface to split the crab's carapace into approximately right and left halves along a midline axis from a forward side of the carapace to a rearward side of the carapace.

\* \* \* \* \*